United States Patent [19]

Stephens et al.

[11] 4,062,508
[45] Dec. 13, 1977

[54] INTEGRATED HELICOPTER FLIGHT CONTROL

[75] Inventors: John A. Stephens, Aberdeen; Ralph J. Kibler, Phoenix, both of Md.

[73] Assignee: The United States of America as represented by the Secretary of the Army, Washington, D.C.

[21] Appl. No.: 713,167

[22] Filed: Aug. 10, 1976

[51] Int. Cl.$^2$ ............................................. B64C 27/56
[52] U.S. Cl. ............................... 244/83 F; 74/471 R; 74/491
[58] Field of Search ................ 244/17.11, 83 B, 83 C, 244/83 F; 74/471 R, 471 XY, 491

[56] References Cited

U.S. PATENT DOCUMENTS

| | | | |
|---|---|---|---|
| 2,505,020 | 4/1950 | Weisman | 74/471 R |
| 2,856,788 | 10/1958 | Jovanovich | 74/471 R |
| 3,971,536 | 7/1976 | Rollins | 74/471 R |

Primary Examiner—George E. A. Halvosa
Assistant Examiner—Charles E. Frankfort
Attorney, Agent, or Firm—Nathan Edelberg; Robert P. Gibson; Saul Elbaum

[57] ABSTRACT

A helicopter rotor control mechanism is provided in which cyclic and collective rotor control functions are performed by a single integrated control having three degrees of freedom and operable by either or both hands of the pilot as desired. The integrated control comprises a floor mounted control column rotatable about a fore and aft collective pitch control axis and a pair of hand grips mounted for rotation about two independent cyclic control axes (by one or both hands of the operator) in a control head assembly mounted on the upper end of the floor mounted control column. The floor column and control head effect displacement of collective pitch, cyclic pitch and cyclic roll output rods for ultimate control of the helicopter rotor.

8 Claims, 9 Drawing Figures

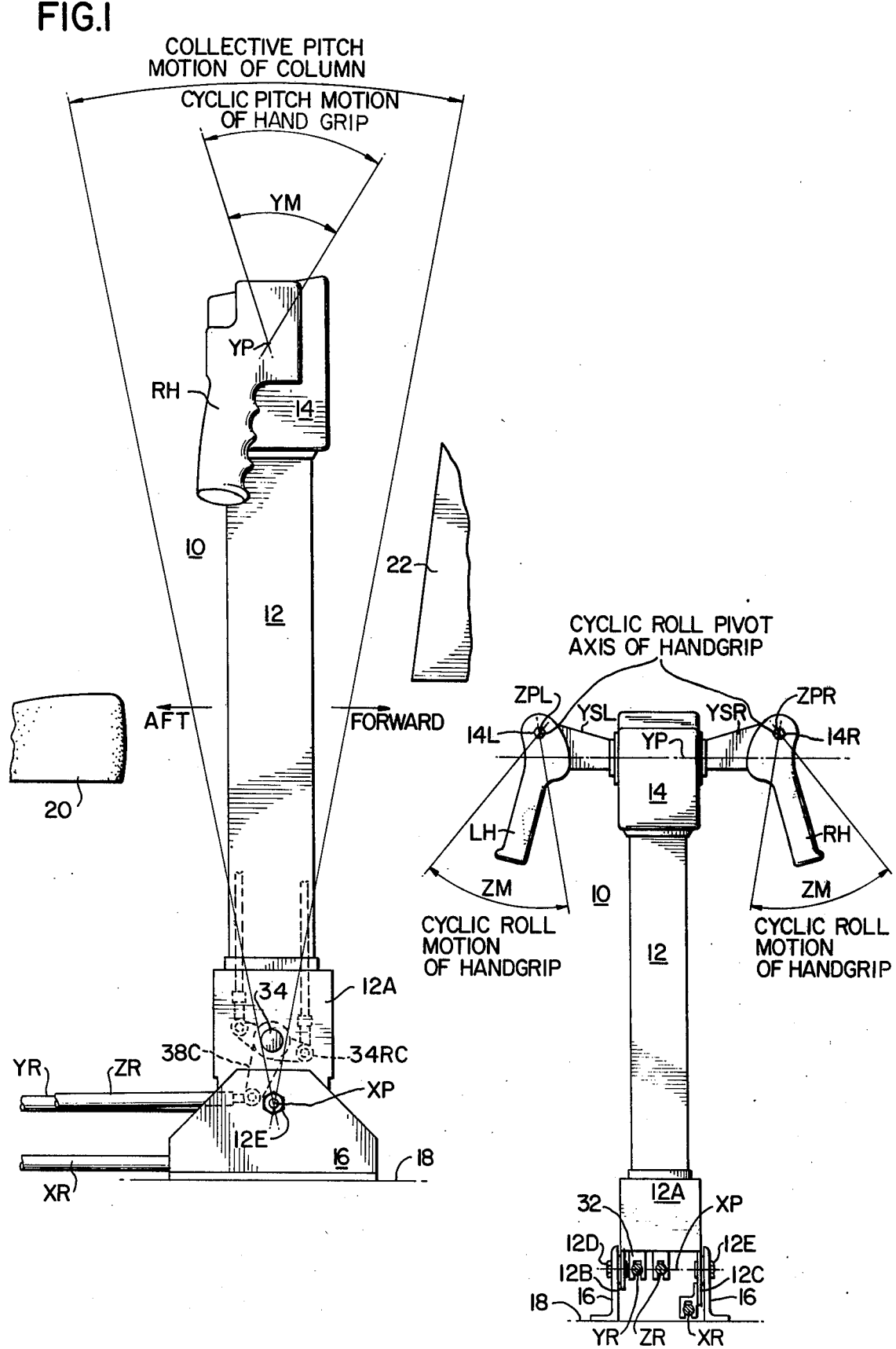

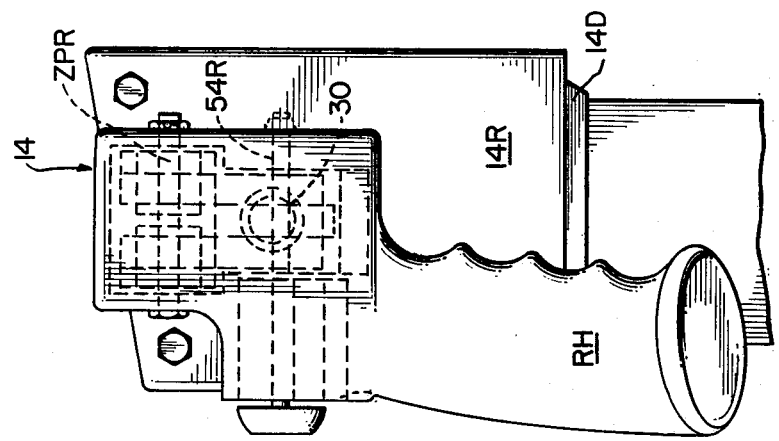
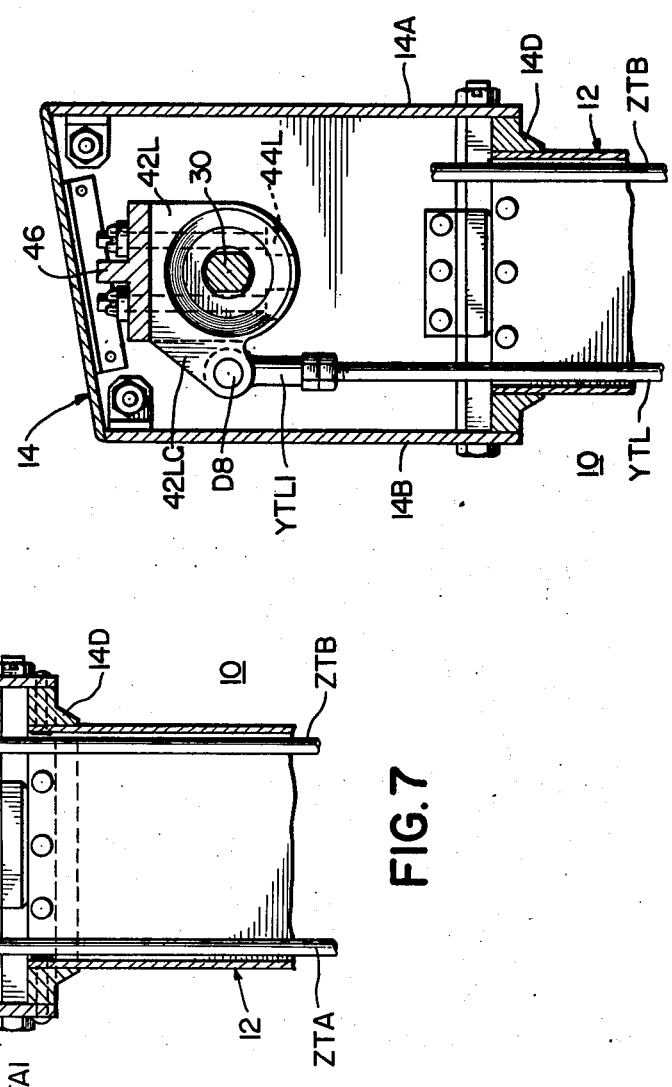
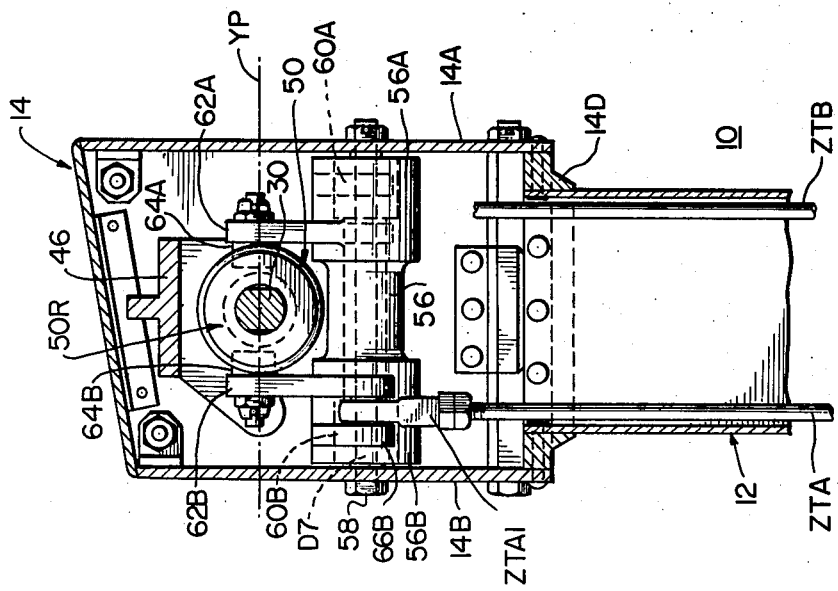

INTEGRATED HELICOPTER FLIGHT CONTROL

RIGHTS OF THE GOVERNMENT

The invention described herein may be manufactured, used, and licensed by or for the U.S. Government for governmental purposes without the payment to me of any royalty thereon.

FIELD OF THE INVENTION

This invention relates to flight control means for helicopters and more particularly to a single flight control means having the capability of effecting both the collective and cyclic control functions in helicopters utilizing main rotor controls of the swash plate type in such a way as to permit efficient control with one hand of the operator.

BACKGROUND OF THE INVENTION

In swash plate rotor controls, the swash plate is mounted for simultaneous rotation on two gimbaled horizontal axes and has a third degree of freedom in the vertical direction. The vertical articulation of the swash plate results in changes in overall rotor-blade pitch regardless of the axial position of the blade. This pitch control is referred to in the art as collective pitch control or collective control. Orientation control of the swash plate combined with its freedom to rotate on its two gimbaled axes induces cyclic changes in the rotor-blade pitch as the blade sweeps through 360° of axial rotation. This pitch control is referred to in the art as cyclic pitch control or cyclic control.

Collective pitch controls the amount of thrust produced by the rotor and cyclic pitch induces changes in the plane of rotation of the rotor about the longitudinal and lateral axes of the helicopter airframe to provide translational control.

Heretofore, these two basic functions have been isolated into two separate lever controls utilized by the aviator, namely, the collective and cyclic controls. In order to maintain the velocity vector of a helicopter in various modes of helicopter flight, there are encountered situations that require coordinated and simultaneous movement of the collective and cyclic controls. This requires the use of both hands by the pilot and thus defines a long standing problem in the art.

If only one hand is needed by a helicopter pilot to effect both collective and cyclic controls, the difficulty of overall flight task accomplishment would be measurably reduced and would be of invaluable assistance in maintaining continuous flight should the pilot be injured, for example, under battle conditions in military applications.

It is, therefore, an object of the present invention to provide a new and novel flight control means for helicopters capable of effecting in a single control means both the cyclic and collective control functions in a swash plate controlled rotor system.

Another object of the present invention to provide a new and novel flight control means for helicopters capable of effecting in a single control means both the cyclic and collective control functions in a swash plate controlled rotor system and of simplified operation; and in which only one hand of the pilot is required to effect such control functions in any mode of helicopter flight.

These and other objects of the invention will become more fully apparent with reference to the following specification and drawings which relate to a preferred embodiment of the present invention.

SUMMARY OF THE INVENTION

The integrated control of the present invention comprises a floor mounted control column pivoted on the floor for fore and aft rotation about the collective pitch pivot axis for the control, the said pitch axis being adjacent the floor.

At the top of the floor column is provided a cyclic control head having two opposed articulated handgrips positioned such that one of a pilot's hands is readily engageable with a corresponding left or right grip when a pilot is seated adjacent the control.

The floor column is positioned to be between the legs of a pilot when the pilot is seated adjacent the control.

The handgrips are gauged together for rotation about their two natural axes, these axes being one parallel to the collective pitch axis comprising the cyclic pitch axis and one orthogonal to both the former axes comprising the cyclic roll axis.

By natural axis is meant the axis providing a given control correlated to a logical direction of motion about that axis, i.e., fore and aft rotation for cyclic pitch and lateral rotation for cyclic roll. Thus, the aircraft will respond in the direction of movement of the handgrips.

Each of the three axial rotations causes displacement of a respective control rod which in turn actuates the rotor control head (swash plate mechanism) as is well known in the art.

In practice, as with any aircraft attitude control, the collective and cyclic control movements are normally composed of simultaneous movements about the several axes to effect the ultimate directional control of the aircraft desired by the pilot.

The collective pitch control is effected by pulling on rather than rotating the handgrips such that the fore and aft motions imparted to the control column about the collective pitch axis. A pull towards the pilot (aft) causes the aircraft to rise and a push on the grips (forward) causes the aircraft to descend.

The control column position when the aircraft is on the ground is fully forward against the instrument panel to facilitate pilot ingress and egress. Normal flight position, for example, is preferably about two-thirds aft in the full range of control to facilitate the use of armrests and comfortable pilot posture.

One or both hands of the pilot may be used to effect full collective and cyclic rotor control.

BRIEF OF THE DRAWINGS

FIG. 1 is a side elevation of the flight control mechanism of a preferred embodiment of the present invention;

FIG. 2 is an aft end view of the flight control mechanism shown in FIG. 1;

FIG. 7 is a cross-section taken along line 7—7 of FIG. 6;

FIG. 8 is a cross-section taken along line 8—8 of FIG. 6; and

FIG. 9 is a side elevation of the control head of FIG. 6 illustrating a preferred handgrip configuration for the cyclic control functions.

DETAILED DESCRIPTION OF THE DRAWINGS

Figure 3:
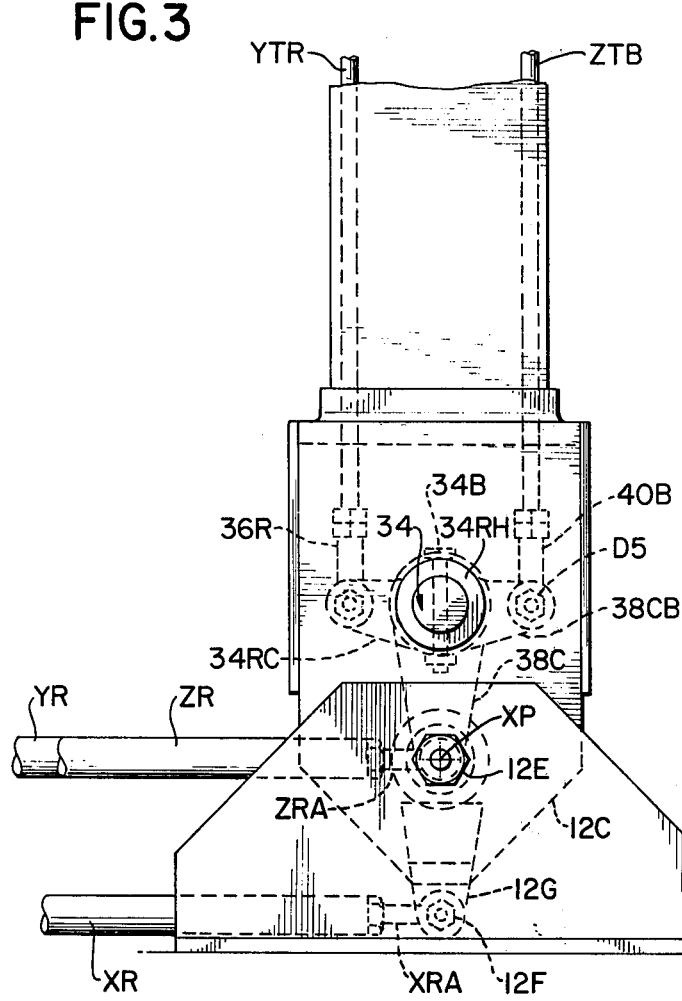
FIG. 3 is an enlarged detail of the control rod linkages in the lower portion of FIG. 1.

Referring in detail to the drawings and with particular reference to FIGS. 1 and 2, the integrated control 10 of the present invention is shown as including a floor mounted collective control column 12 having a cyclic control head 14 mounted on the top end thereof.

The lower end of the collective control column 12 terminates in a boot 12A which is bifurcated to provide bearing extensions 12B and 12C mounted on suitable pivot pin assemblies 12D and 12E, respectively, in a pair of stanchions 16 on the cabin deck 18 of the helicopter (not shown). The pilot's seat 20 and instrument panel 22 are shown in typical relation to the integrated control 10 of FIG. 1.

The pivot pin assemblies 12D and 12E are coaxial pivot means defining the collective pitch axis XP which, as shown, is substantially parallel to the cabin deck 18 and transverse the fore and aft axis of the helicopter.

From between the stanchions 16, output rods XR, YR and ZR for the various control functions of collective pitch, cyclic pitch and cyclic roll, respectively, extend aft along the cabin deck 18 to a conventional control head (not shown) for the helicopter rotor.

Figure 5:
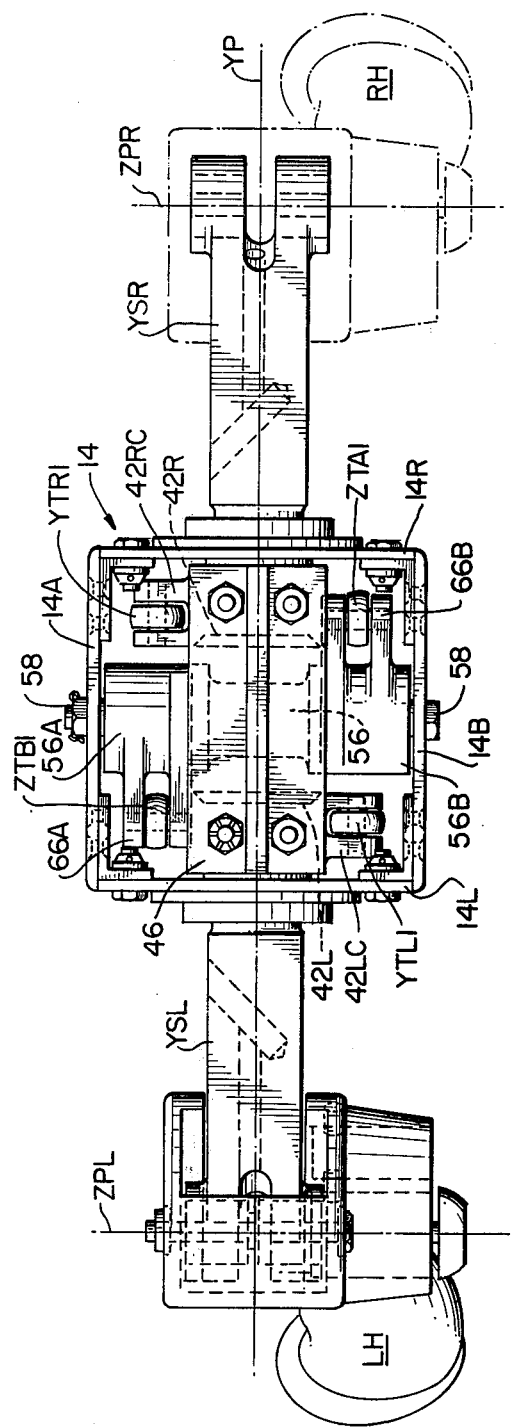
FIG. 5 is a top plan view of the column mounted control head of the present invention with the cover removed.
Figure 6:
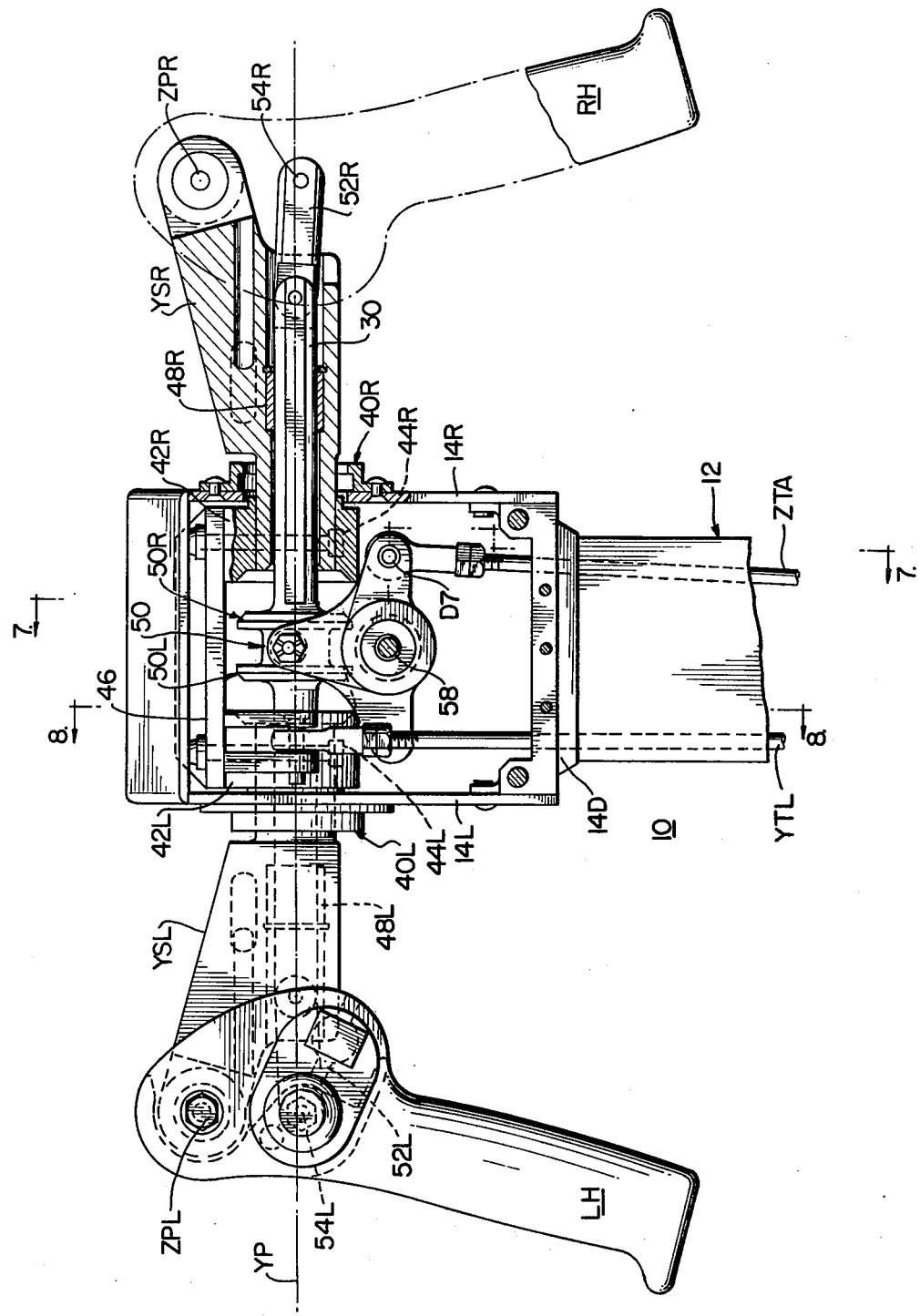
FIG. 6 is an aft end view of the control head of FIG. 5 with the aft end plate removed.

The control head 14 of the integrated control 10 includes right and left articulated handgrips RH and LH, respectively, with movement of one handgrip coordinated with identical movement of the other through mechanism to be more fully described in reference to FIGS. 5-9. The handgrips RH and LH are mounted, respectively, on opposed, coaxial stub shafts YSL and YSR which are journalled for rotation about the cyclic pitch axis YP, the latter being coincident with the axis of a cyclic roll actuating shaft 30 which is best illustrated in FIGS. 6-9.

Cyclic pitch control motion YM of the handgrips RH and LH about the cyclic pitch axis YP is illustrated for the right handgrip RH in FIG. 1.

The cyclic roll control motion ZM is about the two cyclic roll pivot axis ZPL and ZPR the latter being coaxial with pivot assemblies 14L and 14R in the left and right handgrips LH and RH, respectively, and orthogonally disposed with respect to the cyclic pitch pivot axis YP.

Figure 4:
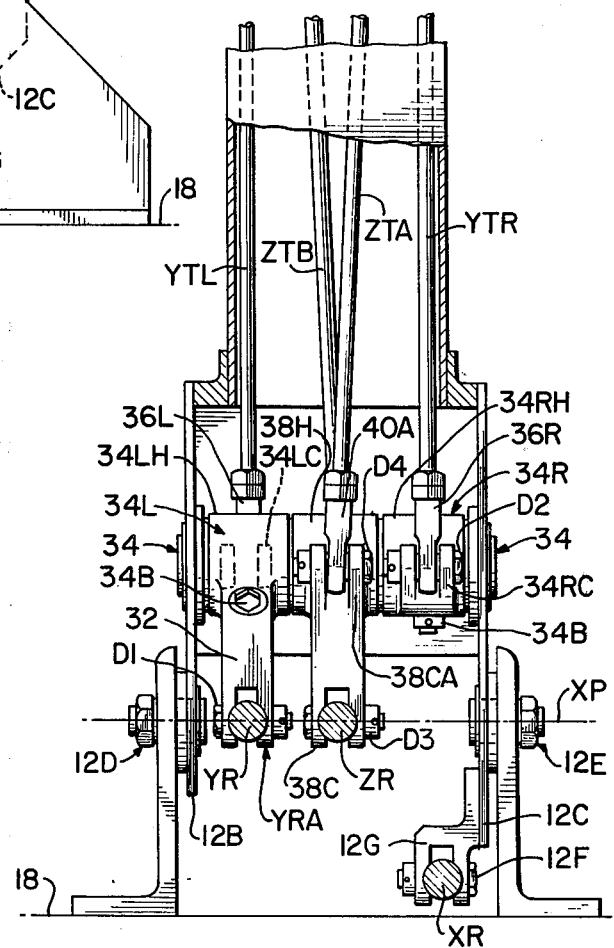
FIG. 4 is an enlarged detail of the control rod linkages in the lower portion of FIG. 2.

Referring now to FIGS. 1, 2, 3 and 4, the driving connections for the output rods XR, YR and ZR will now be more fully described.

The collective pitch output XR includes a rod tip assembly XRA which is connected to a drive pin or pivot 12F mounted transverse the axis of the said rod XR on a drive yoke 12G extending beneath the bearing extension 12C.

The cyclic pitch output rod YR includes a rod tip assembly YRA (identical to the tip assembly XRA) which is connected with a transverse drive pin D1 in a drive yoke 32 radially dependent from one end 34A of a cyclic control shaft assembly 34 mounted above the collective pitch axis. The left and right end portions 34L and 34R of the cyclic control shaft assembly 34 are enlarged hubs 34LH and 34RH carrying radial crank arms 34LC (shown only schematically in dotted lines) and 34RC, respectively, both being identical but opposed structures in the provision of a bidirectional bell crank assembly for driving the output yoke 32 and cyclic pitch output rod YR.

The left and right hand hub 34LH and 34RH are prevented from rotating with respect to the cyclic control shaft 34 by means of diametrically disposed anchor bolts 34B.

Cyclic pitch input or tension rods YTL and YTR are connected through respective rod tip assemblies 36L and 36R to the bifurcated crank arms 34LC and 34RC on the left and right hubs 34LH and 34RH by drive pins D2 (shown only for the crank 34RC) on the cyclic output control shaft 34 such that vertical displacement of the cyclic pitch input or tension rods YTL and YTR cause the shaft 34 to rotate and the drive yoke 32 and drive pin D1 to cause a corresponding axial displacement of the cyclic pitch output rod YR.

The displacement of the cyclic pitch input or tension rods YTL and YTR is effected by the handgrips LH and RH and mechanism in the control head 14 which will be more fully described herein with reference to FIGS. 5-9.

The cyclic roll output rod ZR is displaced by means of a transverse drive pin D3 and a rod tip assembly ZRA. The drive pin D3 is mounted in a bifurcated output crank arm 38C which is radially dependent from a central hub 38H mounted for free rotation on the cyclic output control shaft 34 between the left and right hubs 34LH and 34RH.

A pair of diametrically opposed input crank arms 38CA and 38CB displaced 90° from the output crank 38C are provided on the central hub 38H to complete a bidirectional bell crank assembly for cyclic roll control.

All of the crank arms 38C, 38CA and 38CB are bifurcated for mounting transverse drive pins D3, D4 and D5, respectively. The drive pins D4 and D5 cooperate with rod tip assemblies 40A and 40B, respectively, on cyclic roll tension or input rods ZTA and ZTB to rotate the hub 38H and output crank 38C to thereby displace the cyclic roll output rod ZR via the transverse drive pin D3.

The details of the mechanism within the cyclic control head 14 will now be described with reference to FIGS. 5-9.

The control head 14 is shown as including a housing comprised of fore and aft plates 14A, 14B and left and right side plates 14L and 14R forming a generally rectangular box on top of the floor column 12 to which the head 14 is affixed by a suitable boot 14D or the like.

The left and right cyclic pitch stub shaft assemblies YSL and YSR are journalled in the left and right side plates 14L and 14R by means of left and right journal bearing assemblies 40L and 40R and extend inwardly of the side plates to terminate in internal left and right hub means 42L and 42R which are keyed to the respective stub shafts by suitable key means 44L and 44R. The cyclic pitch control stub shafts YSL and YSR are gauged for coincident motion by means of a bridging bar 46 mutually secured at opposite ends thereof to the left and right internal hubs 42L and 42R.

The cyclic roll control shafts 30 are coaxially and telescopically mounted in suitable journal means 48L and 48R within the stub shafts YSL and YSR and have a common and centrally located grooved drive collar 50 which through input crank means to be hereinafter described, imparts displacements for cyclic roll control to the roll tension or input rods ZTA and ZTB.

The roll control shafts 30 are connected to the left and right handgrips LH and RH by pivoted drag links 52L, 52R pivoted to the said handles at 54L, 54R beneath the cyclic roll pivot axes ZP such that translation left and right of the roll control rods 30 is coaxially along the cyclic pitch axis YP.

A double bell crank assembly 56 is mounted for rotation on a cross-shaft 58 orthogonally disposed with reference to the cyclic roll control shafts 30 and extending beneath the latter between the fore and aft wall plates 14A, 14B.

The ends of the double bell crank 56 comprise fore and aft hubs 56A and 56B, respectively, including respective ball bearing assemblies 60A and 60B acting between the hubs and the cross-shaft 58. A reduced center portion provides displacement clearance for the slotted drive collar 50 on the roll control shaft 30.

Fore and aft input drive links 62A and 62B extend respectively upward from the hubs 60A and 60B and mount, at their outmost ends, fore and aft roller bearing means 64A and 64B which engage between the annular flanges 50L and 50B of the flanged drive collar 50 on the roll control shafts 30, to translate the motion of the drive collar 50 to the double bell crank 56.

Bifurcated fore and aft output crank arms 66A and 66B on the hubs 56A and 56B, respectively, carry transverse drive pins D6 and D7 which in turn engage rod tip assemblies ZTB1 and ZTA1, respectively, to constrain translation of the roll input or tension rods ZTB, ZTA in response to axial movement of the roll control shaft 30.

Movement of the cyclic pitch control tension or input rods YTL and YTR is accomplished by means of bifurcated left and right crank levers 42LC and 42RC which are integral with and extend radially from the hubs 42L and 42R, respectively, on the cyclic pitch stub shafts YSL and YSR.

These bifurcated crank levers 42LC and 42RC carry transverse drive pins as previously disclosed (drive pin D8 shown on crank lever 42LC in FIG. 8) which cooperate with the input rod tip assemblies YTL1 and YTR1 of the collective pitch tension or input rods YTL and YTR, respectively, to effect movement of these rods in correlation to rotation of the cyclic pitch control stub shafts YSL and YSR.

It should be noted that the inner end faces of the hubs 42L and 42R are conformally recessed to receive the drive flanges 50L and 50R, respectively, of the drive collar 50 to provide maximize displaceability of the latter in the control head 14.

OPERATION OF THE INVENTION

With joint reference to FIGS. 1 through 9, the operation of the integrated control 10 of the present invention is as follows:

Collective Pitch

Handgrip LH and/or handgrip RH are/is pushed or pulled in either a fore or aft direction. This causes the entire floor column 12 (and the control head 14) to rotate about pivot pins 12D and 12E on the collective pitch axis XP, causing corresponding fore and aft motions of the drive yoke 12G, rod tip assembly XRA and collective pitch output rod XR.

Forward movement of the control column 12 constrains the helicopter to descend while aft movement of the said column 12 constrains the helicopter to ascend.

Cyclic Pitch

Handgrip LH and/or handgrip RH are/is rotated about the cyclic pitch pivot axis YP causing rotation of the cyclic pitch control stub shafts YSL and YSR via the bridging bar 46. The corresponding rotation of the hubs 42L and 42R causes displacement of the cyclic pitch control input or tension rods YTL and YTR via the drive cranks 42LC, 42RC and rod tip assemblies YTL1 and YTR1. The tension rods YTL and YTR in turn drive the double bell crank assembly 34 via the rod tips 36L, 36R and input cranks 34LC, 34RC to rotate the output crank 32 and correspondingly displace the cyclic pitch control rod YR axially via the drive pin D1 and tip assembly YRA.

Cyclic Roll

Handgrip LH and/or handgrip RH are/is rotated about the corresponding cyclic roll pivot axes ZPL, ZPR, which causes both said handgrips to so rotate in unison through the roll control shaft 30 and drag hubs 52L, 52R, thereby also displacing the drive collar 50.

The annular flanges 50L and 50R on the drive collar 50 and roller bearings 64A, 64B displace the input cranks 62A, 62B of the double bell crank 56, whereby the output cranks 56B, 56A thereof drive, respectively, the cyclic roll input or tension rods ZTA, ZTB via the respective input tip assemblies ZTA1, ZTB1.

The tension rods ZTA, ZTB correspondingly drive the input cranks 38CA, 38CB of the double bell crank 38 and cause a corresponding displacement of the output crank 38C and drive pin D3.

Thus, via the rod tip assembly ZRA, interacting with the drive pin D3, the cyclic roll output rod ZR is constrained through an axial translation corresponding to the input motion of the handgrips LH, RH about the cyclic roll pivot axes ZPL and ZPR.

The location of the cyclic pitch and roll output rod tip assemblies YRA and ZRA closely adjacent the collective pitch pivot axis XP, substantially precludes cross-talk between the various collective and cyclic command functions.

For example, when the various cyclic command bell crank output 34LC, 34RC and 38C are in a displaced position about the axis of the common shaft 34, as schematically illustrated in FIG. 1, a change in the collective pitch input, i.e., a rotation fore or aft of the floor column 12 about the pivot axis XP, will cause only a slight raising or lowering of the rod ends XRA, YRA, ZRA and the cyclic output rods YR and ZR with no discernible axial translation of the latter rods.

Thus, intermix or cross-talk between the collective and cyclic functions is precluded regardless of the position of one set of control linkage versus the other or the magnitude of the commands introduced. Cyclic pitch and roll movements in the control head 14 are completely devoid of mixing and/or cross-talk throughout their entire movement envelope.

As a result a precise integrated controller for helicopters has been provided which is readily operable with one or both hands by the pilot.

Furthermore, the symmetry of the linkages in the integrated controller 10 permit reversing of the mechanism with no binding, thereby readily adopting same for dual control installations.

I wish it to be understood that I do not desire to be limited to the exact details of construction shown and described, for obvious modifications can be made by a person skilled in the art.

We claim:

1. In a flight control means for helicopters, means generating cyclic and collective control function commmands for rotor control heads of the swash plate type, comprising:
   a main control column having pivot means at one end thereof mounting said column for rotation in a fore and aft plane to provide a collective pitch control means;
   a cyclic control head mounted at the other end of said control column comprising:
      cyclic pitch control means mounted in said control head for rotation in a second plane parallel to said fore and aft plane; and
      cyclic roll control means mounted on said control head for rotation in a third plane perpendicular to said fore and aft and second planes;
   common actuating means for said collective pitch, cyclic pitch and cyclic roll control means including first and second handgrips mounted on opposite sides of said cyclic control head and having common interconnections with said collective and cyclic control means to permit full actuation of said function command generating means with each of said handgrips;
   collective pitch, cyclic pitch and cyclic roll control output means extending from said control column for interconnection with the said rotor control head; and
   actuating means respectively interconnecting said control output means with said cyclic control head;
   wherein said cyclic control head includes first shaft means mounting said handgrips one on each end thereof for rotation in said second plane;
   pivot means mounting each of said handgrips on said ends of said first shaft means for rotation in said third plane;
   first bell crank and lever means driven by said first shaft means;
   a displaceable yoke means driven by said handgrips axially of said first shaft means in response to rotation of said handgrips in said third plane; and
   second bell crank and lever means driven by said yoke means; and
   wherein said control column includes crank means drivingly interconnecting the lowermost end of said control column, below said control column pivot means, with said collective pitch control output means;
   said first bell crank and lever means drivingly interconnecting said handgrips with said cyclic pitch control output means; and
   said second bell crank and lever means drivingly interconnecting said handgrips with said cyclic roll control output means.

2. The invention defined in claim 1, wherein the interconnections between said cyclic pitch and roll control output means and said first and second bell crank and lever means occurs substantially on the axis of said handgrip pivot means to substantially preclude crosstalk effect between said cyclic and collective control functions.

3. The invention defined in claim 1, wherein said first bell crank and lever means comprises:
   a double bell crank driven by said first shaft means;
   a pair of intermediate levers extending therefrom; and
   an output crank having two input rims driven by said intermediate levers and an output arm drivingly interconnected with said cyclic pitch control output means.

4. The invention defined in claim 3, wherein said cyclic pitch control output means comprises a cyclic pitch control rod and said output arm is pivotally connected to one end of said cyclic pitch control rod at a position substantially on the axis of said control column pivot means.

5. The invention defined in claim 1, wherein said cyclic roll control output means comprises a cyclic roll control rod; and wherein said second bell crank and lever means comprises:
   second shaft means in said cyclic control head disposed orthogonally to said first shaft means;
   follower means radially extending from said second shaft means for rotation therewith and drivingly engaging said yoke means;
   double bell crank means on said second shaft means;
   a pair of intermediate levers extending from said double bell crank means; and
   an output crank having two input arms driven by said intermediate levers and an output arm drivingly interconnected with said cyclic roll control rod.

6. The invention defined in claim 5 wherein said output arm is pivotally interconnected to one end of said cyclic roll control rod at a position substantially on the axis of said control column pivot means.

7. The invention defined in claim 1, wherein said cyclic roll and cyclic pitch control output means comprise cyclic roll control and cyclic pitch control rods, respectively; wherein said first bell crank and lever means comprises:
   a first double bell crank driven by said first shaft means;
   a first pair of intermediate levers extending therefrom; and
   a first output crank having two first input rims driven by said intermediate levers and a first output arm drivingly interconnected with said cyclic pitch control rod; and
   wherein said second bell crank and lever means comprises:
   second shaft means in said cyclic control head disposed orthogonally to said first shaft means;
   follower means radially extending from said second shaft means for rotation therewith and drivingly engaging said yoke means;
   second double bell crank means on said second shaft means;
   a second pair of intermediate levers extending from said double bell crank means; and
   a second output crank having two second input arms driven by said second pair of intermediate levers and a second output arm drivingly interconnected with said cyclic roll control rod.

8. The invention defined in claim 7, wherein said first and second output arms are pivotally interconnected, respectively, to one end of said cyclic pitch and cyclic roll control rods substantially on the axis of said control column pivot means.